United States Patent

[11] 3,569,709

| [72] | Inventor | Martin R. Wank |
| | | Mountain View, Calif. |
| [21] | Appl. No. | 732,230 |
| [22] | Filed | Mar. 27, 1968 |
| [45] | Patented | Mar. 9, 1971 |
| [73] | Assignee | Optical Coating Laboratory Inc. |
| | | Santa Rosa, Calif. |

[54] THERMAL IMAGING SYSTEM UTILIZING LIQUID CRYSTAL MATERIAL
11 Claims, 2 Drawing Figs.

| [52] | U.S. Cl. | 250/83.3, 250/83 |
| [51] | Int. Cl. | G01j 1/48 |
| [50] | Field of Search | 250/83, 83.3 (IR) |

[56] References Cited
UNITED STATES PATENTS

| 3,397,313 | 8/1968 | Mast | 250/83 |
| 3,401,262 | 9/1968 | Fergason et al. | 250/83 |
| 3,410,999 | 11/1968 | Fergason et al. | 250/83.3IRI |
| 3,441,513 | 4/1969 | Woodmansee | 250/83 |

*Primary Examiner*—Archie R. Borchett
*Attorney*—Flehr, Hohback, Test, Albritton & Herbert ABSTRACT: A thermal imaging system wherein an infrared transmitting lens forms an image of an object from infrared rays emitted by the object and projects the image on a film of liquid crystal material having a thermally responsive color spectrum. The film of liquid crystal material is heat biased to the characteristic temperature range at which the material exhibits thermally sensitive optical scattering properties to accentuate the thermally evoked image.

PATENTED MAR 9 1971 3,569,709
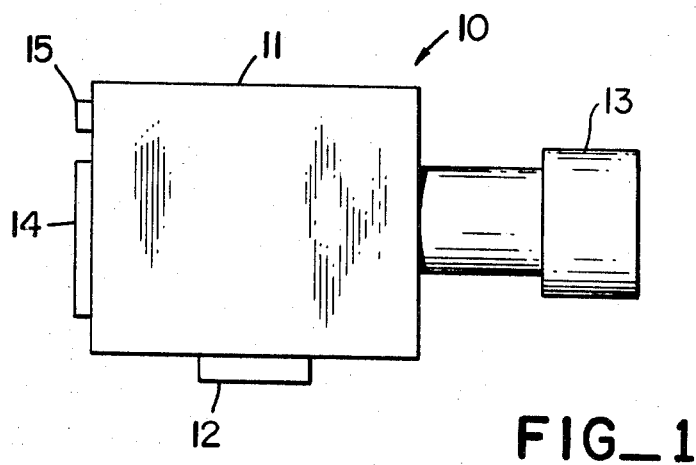
FIG_1
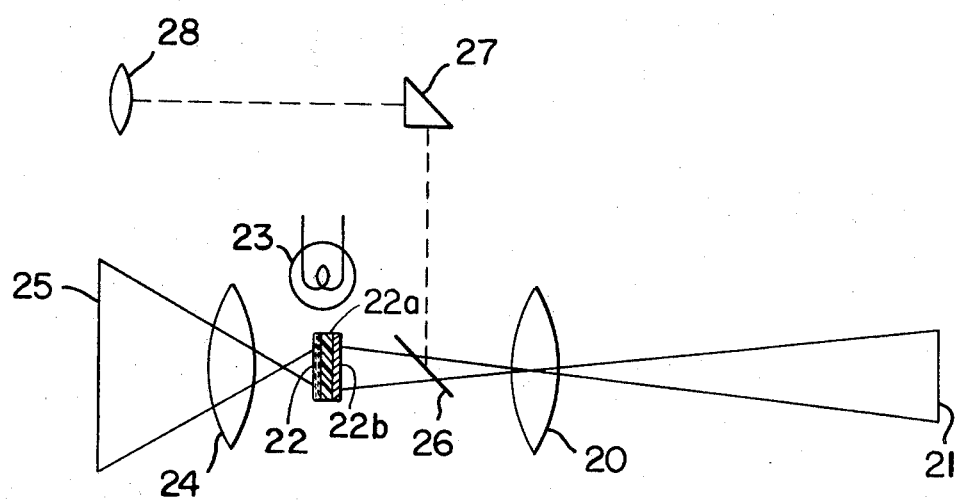
FIG_2
INVENTOR.
MARTIN R. WANK
BY
Townsend and Townsend
ATTORNEYS

THERMAL IMAGING SYSTEM UTILIZING LIQUID CRYSTAL MATERIAL

This invention relates to a new and improved thermal imaging system useful in detecting flaws in mechanical equipment and defects in electronic circuitry and which is generally useful in determining the thermal characteristics of a monitored field or object. The invention also has application in the fields of medical diagnosis and thermographic printing.

Certain cholesteric compounds known as liquid crystals have been developed and studied which have thermally sensitive optical scattering properties. Thus, compounds such as cholesteryl benzoate exhibit a thermally responsive color spectrum throughout a temperature temperature range or band characteristic of the compound. Typically, the thermally responsive color spectrum is initiated at a characteristic temperature, exhibiting a different color depending upon the temperature throughout a predetermined characteristic temperature range.

Such liquid crystals have been used to study the thermal characteristics of mechanical equipment or electronic circuitry by coating the liquid crystal material directly on the object to be studied. Liquid crystals have been similarly used for medical diagnosis by coating the patient. Alternatively, instead of directly coating the liquid crystal material on the object to be studied, a liquid crystal film is formed on a flexible base which may be placed over and conformed to the surface of the object to be studied.

It is an object of the present invention to provide a new and improved method and apparatus for analyzing the thermal characteristics of an object using liquid crystal material having a thermally responsive color spectrum without the necessity of coating the liquid crystal material directly on the object under study and without the necessity of conforming a film of liquid crystal material to the surface of the object under study.

Another object of the invention is to provide a method and apparatus for determining the thermal characteristics of a monitored field.

In order to accomplish these results the present invention contemplates the provision of an infrared transmitting lens for forming an image of an object or monitored field from infrared rays emitted by the object or monitored field. According to another aspect of the invention a film of liquid crystal material having a thermally responsive color spectrum is positioned in the image plane of the infrared transmitting lens. The film of liquid crystal material is heat biased to a point just below the characteristic temperature at which the material exhibits thermally sensitive optical scattering properties to thereby produce a thermally evoked image of the object or monitored field on the film of liquid crystal material.

The invention also contemplates forming an image of the film of liquid crystal material on a viewing screen for continuously viewing the thermally evoked image on the film of liquid crystal material. Yet another aspect of the invention contemplates providing optical means for simultaneously, directly viewing the object or monitored field under study. Other objects, features and advantages of the present invention will become apparent in the following specification and accompanying drawings.

In the drawings:

FIG. 1 is a diagrammatic view of a thermal imaging camera embodying the present invention.

FIG. 2 is a diagrammatic view of the thermal imaging system housed in the camera illustrated in FIG. 1.

In the embodiment of the present invention illustrated in FIG. 1 there is generally provided a thermal imaging camera 10 comprised of a housing 11 and a tripod mount 12. An infrared transmitting objective lens 13, which may be, for example, a zoom lens, is provided for forming an image of an object or monitored field under study. At the back of the camera there is provided a screen 14 for viewing a thermally evoked image of the monitored field or object under study. Means may be provided for attaching a conventional camera to the viewing screen 14 for providing photographic pictures of the thermally evoked image projected on screen 14. A visual sight or eyepiece 15 is also provided for viewing directly the object or monitored field under study.

The optical system housed within camera 10 is illustrated in FIG. 2. The objective lens of the camera comprises an infrared transmitting lens 20 which may also be an infrared transmitting lens system such as a zoom lens. The infrared transmitting objective lens is adapted to form an image from infrared rays emitted by an object or monitored field 21. Positioned in the image plane of the infrared transmitting lens 20 is a film of liquid crystal material 22 having a thermally responsive color spectrum. The film of liquid crystal material may be formed on a film base 22a such as Mylar. Preferably, the liquid crystal material is coated on the film base on the side opposite the infrared transmitting lens 20. The side of the film base facing the infrared transmitting lens is then provided with a dark coating 22b such as black paint for optimum thermal absorption. Positioned adjacent the film of liquid crystal material is a heater 23 such as a lamp for heat biasing the liquid crystal materials to the characteristic temperature at which the material exhibits thermally sensitive optical scattering properties. A conventional objective lens 24 is also provided to form an image of the film of liquid crystal material on a viewing screen 25 such as a frosted glass screen spaced from the lens 24.

A beam splitter 26 may also be provided interposed between the infrared transmitting objective lens 20 and the film of liquid crystal material 22 for directing a portion of the light via a reflector 27. The reflector may be a prism to an eyepiece lens 28 which permits an observer to view the object or monitored field under study directly.

In using the thermal imaging system disclosed above, the film of liquid crystal material 22 may be heat biased by heater 23 to a temperature just below the characteristic temperature range or band across which the material exhibits a thermally responsive color spectrum. An infrared image from infrared rays emitted by the object or monitored field under study may then be projected onto the film. A thermal image is evoked on the film of liquid crystal material having a coloration dependent upon the thermal characteristics of the object or monitored field.

According to the preferred method of thermal imaging, however, an image of the object or monitored field formed by infrared transmitting lens 20 is first projected n the film of liquid crystal material 22. The temperature of the film of liquid crystal materials is then raised by heater 23 to the characteristic temperature at which the liquid crystal material exhibits thermally sensitive optical scattering properties. The thermally evoked image of the object or monitored field then appears from the background of the film.

While one embodiment of this invention has been shown and described, it will be apparent that other adaptations and modifications can be made without departing from the true spirit and scope of the invention.

I claim:

1. In a thermal imaging system, infrared transmitting lens means adapted to form an image of an object in a plane spaced from said lens means; a film of liquid crystal material having a thermally responsive color spectrum, said film being positioned in the image plane of said infrared transmitting lens means whereby said film is adapted for producing a thermal image having a coloration dependent on the thermal characteristics of the object, said image being visible to the human eye; and heat bias means positioned near said film of liquid crystal material to bias said film at a predetermined temperature.

2. A thermal imaging system as set forth in claim 1 wherein said film of liquid crystal material is coated on a film base.

3. A thermal imaging system as set forth in claim 2 wherein said film of liquid crystal material is coated on the side of the film base opposite the infrared transmitting lens means and the side of the film base facing the infrared transmitting lens means is provided with a dark coating.

4. A thermal imaging system as set forth in claim 1 wherein there is provided a light transmitting imaging lens on the side of the film of liquid crystal material opposite the infrared transmitting lens and a viewing screen adapted to receive an image of said liquid crystal material formed by said light transmitting imaging lens.

5. A thermal imaging system as set forth in claim 4 wherein there is also provided a beam splitter interposed in the optical path between the infrared transmitting lens means and the film of liquid crystal material and wherein there is also provided an eyepiece interposed in the optical path of the split beam from said beam splitter.

6. A thermal imaging system as set forth in claim 1 wherein said infrared transmitting lens means comprises a zoom lens.

7. In a thermal imaging system, infrared transmitting lens means adapted to form an image of an object in a plane spaced from said lens means; a film of liquid crystal material having a thermally responsive color spectrum, said film being positioned in the image plane of said infrared transmitting lens means for producing a thermal image having a coloration dependent on the thermal characteristics of the object, said image being visible to the human eye.

8. In a method of thermal imaging, the steps of thermally biasing a film of liquid crystal material having a thermally responsive color spectrum; forming an image of an object from infrared rays emitted by the object; and projecting said image on the thermally biased film of liquid crystal material to produce a thermal image having a coloration dependent upon the temperature characteristics of said object, said image being visible to the human eye.

9. In a method of thermal imaging, the steps of thermally biasing a film of liquid crystal material having a thermally responsive color spectrum; forming an image of an object from infrared rays emitted by the object; and projecting said image on the thermally biased film of liquid crystal material to produce a thermal image having a coloration dependent upon the temperature characteristics of said object, said image being visible to the human eye.

10. In a thermal imaging system, infrared transmitting lens means adapted to form an image of an object in a plane spaced from said lens means; a film of liquid crystal material having a thermally responsive color spectrum, said film positioned in the image plan of said infrared transmitting lens means for producing a thermal image having a coloration dependent on the thermal characteristics of the object and being visible to the human eye, said film of liquid crystal material being coated on a film base on the side of the film base opposite the infrared transmitting lens means, the side of the film base facing the infrared transmitting lens means being provided with a dark coating; heat bias means positioned near said film of liquid crystal material to bias said film at a predetermined temperature; a light transmitting imaging lens on the side of the film of liquid crystal material opposite the infrared transmitting lens; and a viewing screen adapted to receive an image of said liquid crystal material formed by said light transmitting imaging lens.

11. A thermal imaging system as set forth in claim 10 wherein there is also provided a beam splitter interposed in the optical path between the infrared transmitting lens means and the film of liquid crystal material and wherein there is also provided an eyepiece interposed in the optical path of the split beam from said beam splitter.